Sept. 4, 1956
T. F. PETERSON
2,761,273
DEAD END FOR CABLES
Original Filed Sept. 20, 1946
6 Sheets-Sheet 4
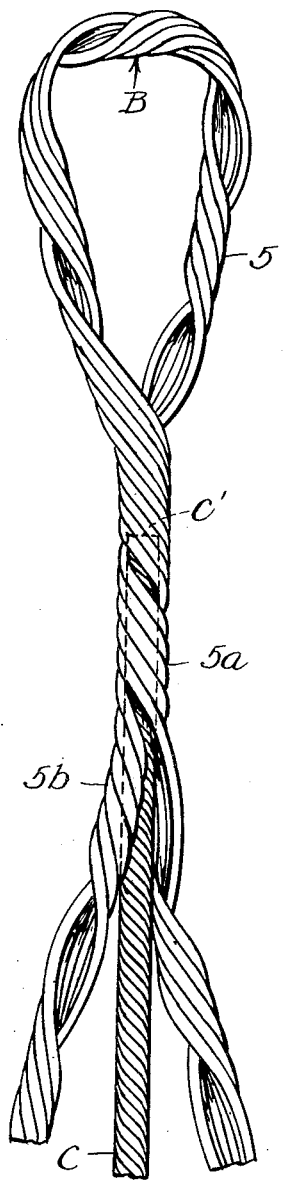
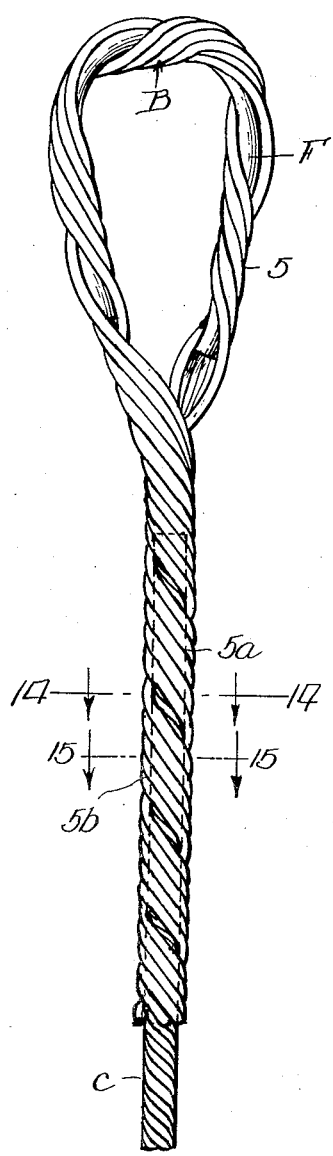
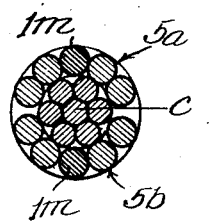
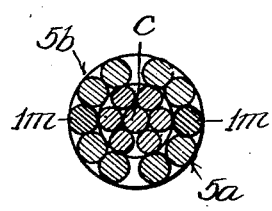
INVENTOR.
Thomas F. Peterson,
BY Sept. 4, 1956  T. F. PETERSON  2,761,273
DEAD END FOR CABLES
Original Filed Sept. 20, 1946  6 Sheets-Sheet 5
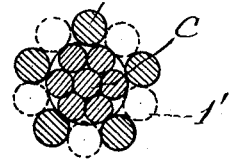
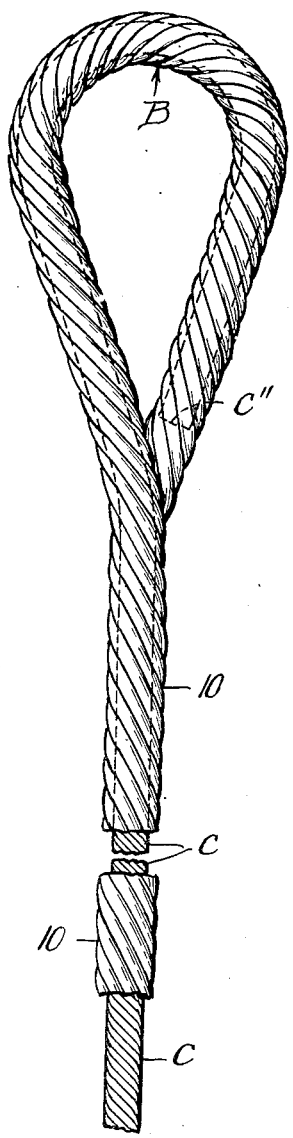
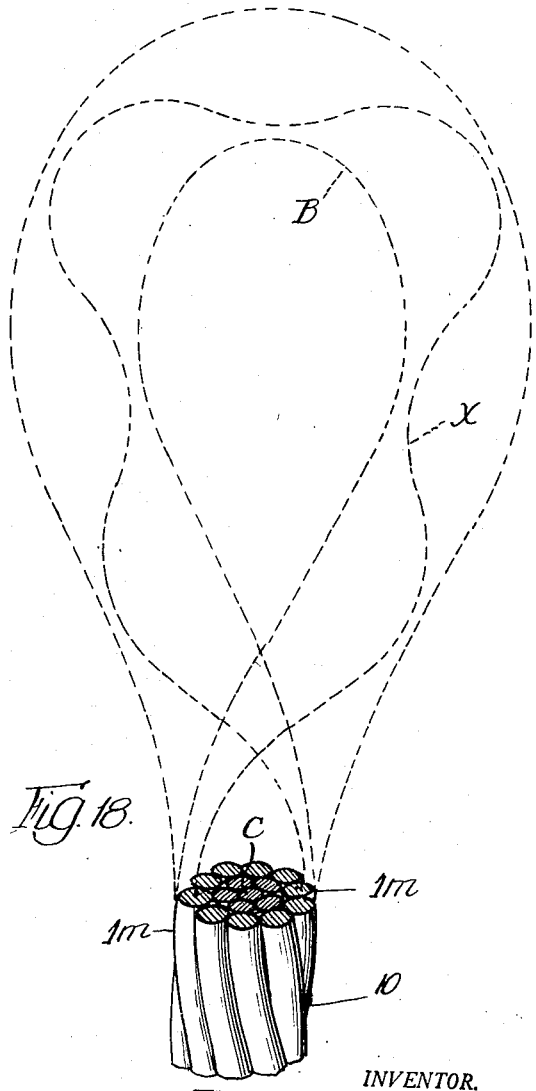
INVENTOR.
Thomas F. Peterson,
BY
Wilkinson Huxley Byron & Hume
Attys.

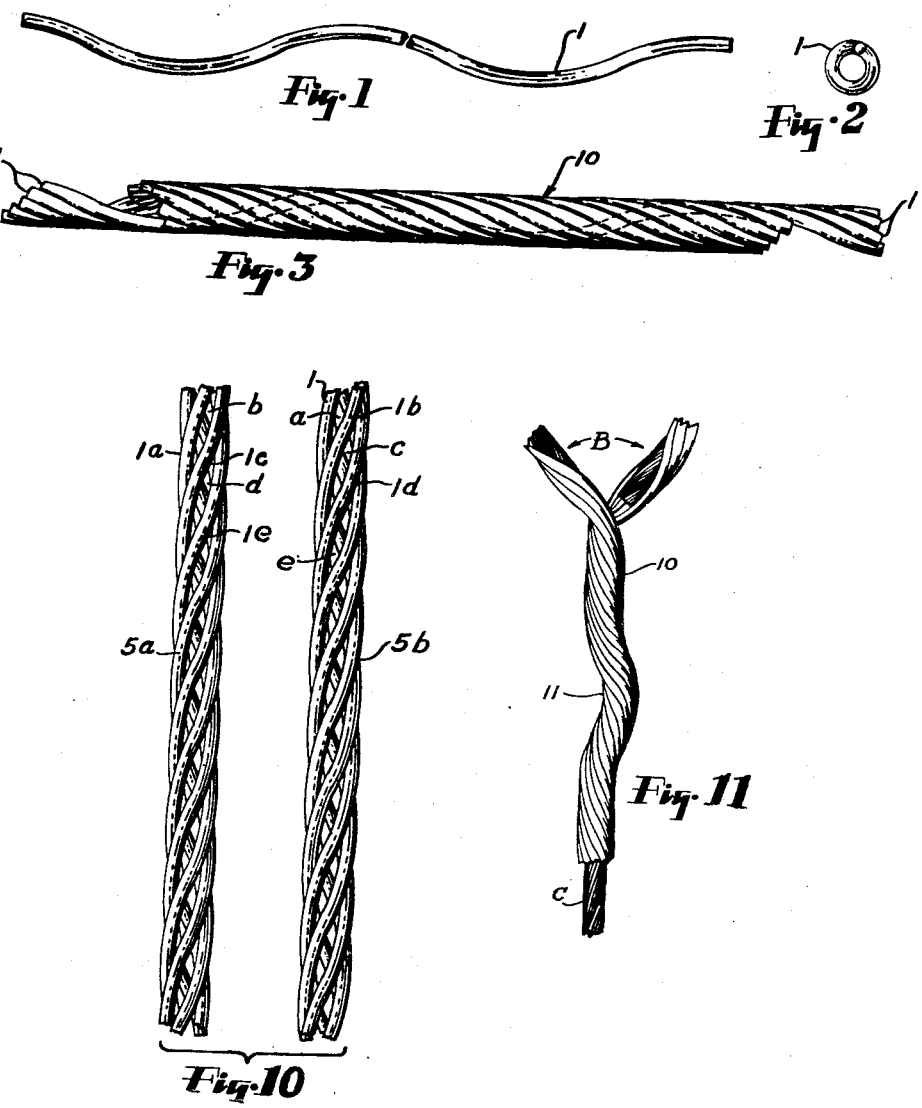

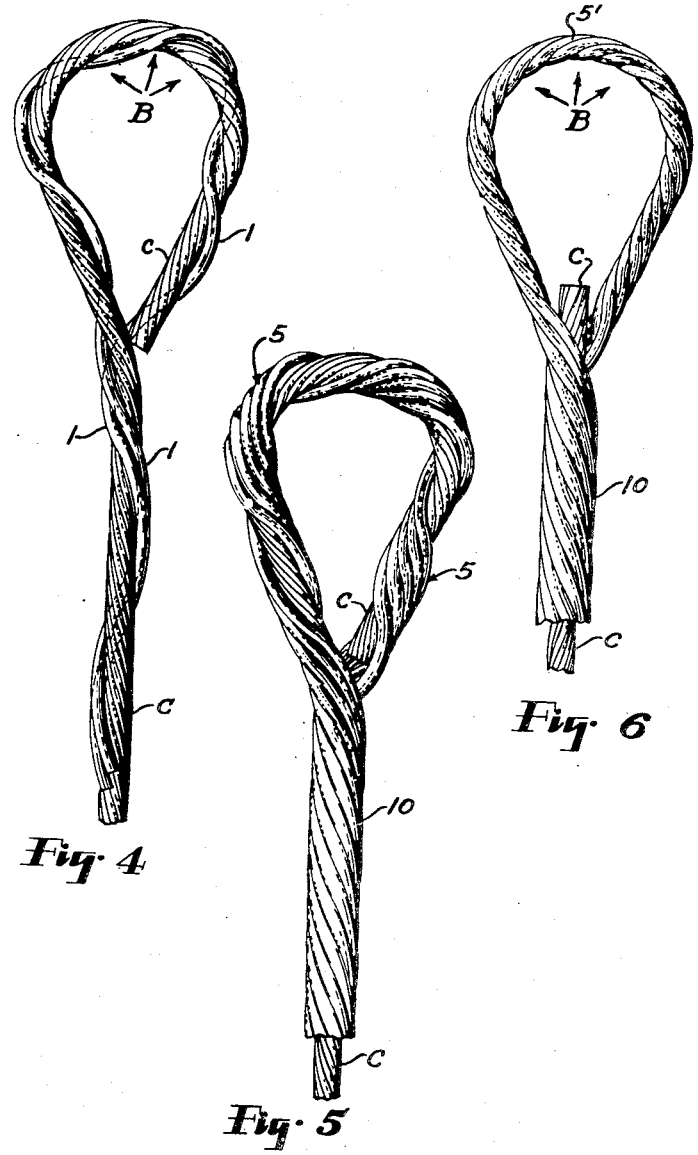

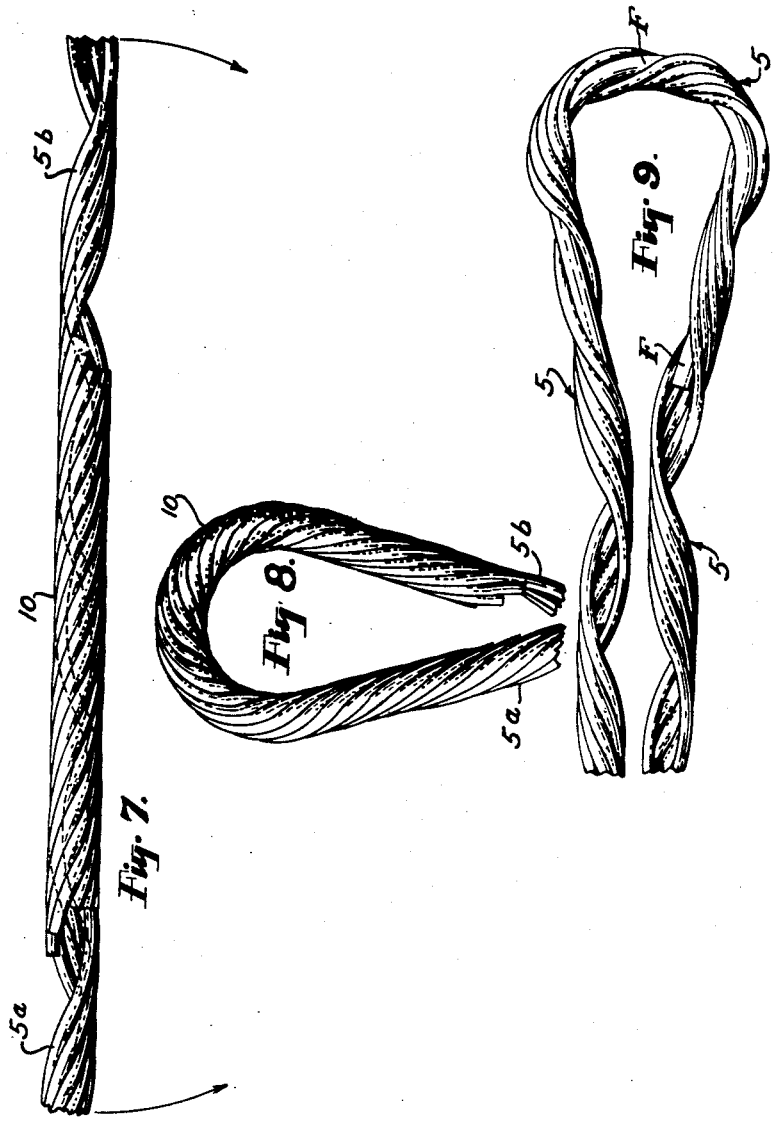

Sept. 4, 1956 T. F. PETERSON 2,761,273
DEAD END FOR CABLES
Original Filed Sept. 20, 1946 6 Sheets-Sheet 6
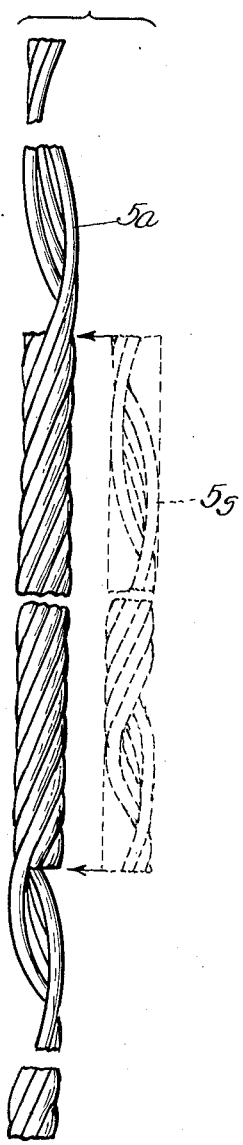
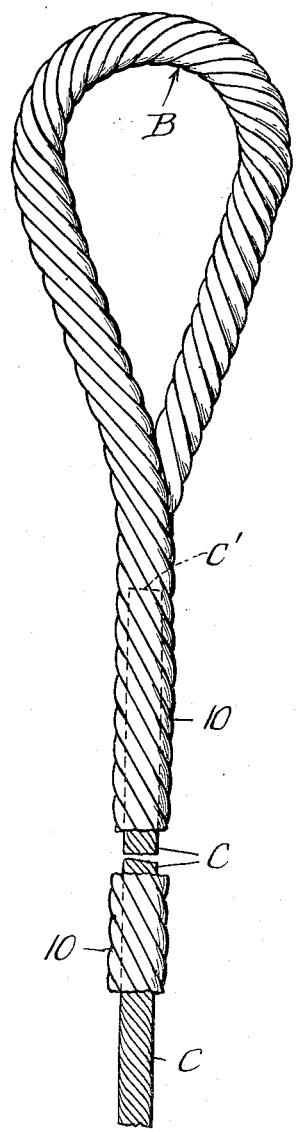
INVENTOR.
Thomas F. Peterson,
BY
Wilkinson Huxley Byron & Hume
Attys.

United States Patent Office 2,761,273
Patented Sept. 4, 1956

2,761,273
DEAD END FOR CABLES

Thomas F. Peterson, Shaker Heights, Ohio, assignor to Preformed Line Products Company, Cleveland, Ohio, a corporation of Ohio Application December 2, 1955, Serial No. 550,580

20 Claims. (Cl. 57—145)

This invention is a division of the subject-matter disclosed in my copending application Serial No. 698,312 field September 20, 1946, for Helically-Preformed Wire Envelope and Methods of Use. Like that application, the present invention stems from those disclosed in my prior Patents Nos. 2,275,019 and 2,587,521.

It is the object of the invention to apply helically-preformed elements in the formation of dead-ends and guy grips on wires, strands, cables, and rods, or to any other elongated body to which the teachings hereof are applicable.

In the accompanying drawings:

Figures 1 and 2 are fragmentary side and end views, respectively, of a helically-preformed element, typical of those applied to the uses and purposes of the present invention.

Figure 3 is a tubular body, shown in side elevation, composed of the elements of Figure 1.

Figure 4 is an elevational view of a dead-end formed on an elongated body by the use of a preformed element similar to that shown in the preceding figures.

Figure 5 is a view corresponding to Figure 4 of a dead-end formed on an elongated body employing a plurality of preformed elements similar to that shown in the preceding figures.

Figure 6 is a dead-end formed on an elengated body similar to that illustrated in Figure 5, in which the body is not within the bight of the helical elements, but terminates adjacent the root of the bight.

Figures 7 to 9, inclusive, are side elevational views illustrating methods of forming dead-ends in accordance with the present invention.

Figure 10 illustrates a modified manner for associating helically-preformed elements as a special precaution against unraveling when formed as a dead-end.

Figure 11 is a fragmentary elevational view of a dead-end made in accordance with the present invention modified to augment its gripping power.

Figure 12 illustrates the application of the half-lay of helically-preformed elements to the end of an elongated body by wrapping the two legs thereof, similar to those shown in Figure 9, into coaxial relation therewith.

Figure 13 shows a completed application similar to that of Figure 12, and further showing the inclusion of a filler element in the bight as shown in Figure 9.

Figures 14 and 15 are cross-sectional views, respectively, taken along lines 14—14 and 15—15 of Figure 13, which sections are represented as being a half a pitch length (or an odd multiple of half-pitch lengths) apart.

Figure 16 shows the formation of a dead-end following either of the techniques described in connection with Figures 7 and 8.

Figure 17 is a cross-sectional view of a dead-end in association with an elongated body illustrating a modification of the invention.

Figure 18 is a schematic perspective view of helically-preformed elements applied as a dead-end to an elongated body or core, and showing a projection of the central axis of certain elements bearing 180° angular relationship to each other around the body through the configuration of the bight indicated in broken lines.

Figure 19 is a composite view corresponding to Figure 7, showing a short half-lay intertwisted in the middle of a long half-lay to constitute a whole bight portion therein.

Figure 20 is a view corresponding to Figure 16 of a dead-end made in accordance with the procedures of Figure 19, but with the cable of association not extended into the bight portion.

The helically-preformed elements applied to the formation of dead-ends as herein described are of sufficient strength and rigidity to grip an elongated body to be dead-ended and to hold under tensile load up to the breaking strength of the latter without slippage. To accomplish this, the elements are preformed to an internal helical diameter somewhat less than the outside diameter of the elongated body to be dead-ended and to a sufficiently open lay to permit wrapping one or more of the elements around such body from its side without exceeding the elastic limit of the material of which such elements are made.

As is disclosed in my prior Patent No. 2,587,521, with which the parent application of the present divisional case was copending, and as is inherent in the half-lay constructions and tubular bodies made from helically-preformed elements shown and described in said parent application, the helically-preformed elements are bent to form a bight or bearing eye intermediate their length, having helical legs extending therefrom which are wrapped coaxially about the elongated body to be dead-ended, so that the helix of each leg is in substantially balanced (180° phase) relationship with the helix of the other when disposed coaxially about the body to be dead-ended. Thus, the two legs of a single preformed element are mutually balanced around the periphery of the body of association when regarded in right section, although not necessarily in the 180° relationship. Likewise, legs of other similar elements, or preformed helices, disposed in inter-association therewith, assume a mutually conforming, self-balancing relation around the axis of said body to sustain and support the latter substantially without deflection.

In Figure 4 there is illustrated one manner of employing a helically-preformed element 1 to secure a bight in the end of a cable or strand after the manner of providing dead-ends therefor. The element 1 is disposed upon the end of a cable C so that half of its extent is secured to the cable and its remaining half extends beyond the end thereof. Then, with the cable bent back upon itself to form bight B, the element 1 is wrapped about the cable contiguously with its starting end, thus to secure the bight in position.

In Figure 5 a sufficient number of elements 1 have been provided completely to enclose the cable as at 10, while the bight portion thereof is engaged by a half-lay 5 of such elements. In practice, a half-lay would be installed upon the cable C after the manner of element 1 in Figure 4, so that when it is returned upon itself the two legs of the half-lay 5 are intertwisted about the cable to provide a closed lay 10, as shown in this figure.

Where it is undesirable to dispose the cable C within the bight, an arrangement similar to that shown in Figure 6 may be employed. A half-lay of the helically-preformed elements is disposed around the cable 10 for approximately one-third to one-half of its length, with the remaining portion extending beyond the cable. That portion of the half-lay which is to form the bight may be pretwisted to form a closed lay 5' for an extent of its length equal to the extent of the bight. The returned half-lay may then be intertwisted with itself about the cable C to provide the whole-lay 10, as shown.

Further modifications are illustrated in Figures 7 and 8, in which two half-lays 5a and 5b are overlapped and intertwisted to provide a closed lay 10. The two half-lays 5a and 5b are then bent downwardly so as to dispose the whole-lay 10 as a bight between them. This disposition is illustrated in Figure 8. The two lays 5a and 5b may then be intertwisted from the bight portion to the limit of their coextensiveness to provide a whole-lay dead-end throughout the entire construction. A cable or other line to be dead-ended may be disposed in the arrangements of Figures 7 and 8, in the same manner as that shown in Figure 16.

A modification of this arrangement is shown in Figures 19 and 20, in which a single half-way 5a of sufficient length to constitute a dead-end when bent in the middle, is provided with a short half-way section 5s, which is intertwisted intermediate the length of the long half-way to constitute a whole-lay bight portion when bent. The procedure similar to that of Figures 7 and 8 is then followed to form a dead-end with a whole-lay bight portion B, Figure 20, with two half-lay legs extending therefrom, which are intertwisted around a core C, to form a whole-lay gripping portion 10 around the core which extends therein to a point of termination C'. Alternatively, the cable may project through the bight portion so as to terminate at C'', as shown in Figure 16.

In Figure 9 another manner of treating a half-lay dead-end is illustrated by the use of a half-lay 5, which may be predisposed about a cable in a manner similar to that already described in connection with Figure 6. However, instead of twisting the half-lay into a reduced whole-lay 5', as in the latter figure, a filler F of cable, of marline, hemp, or other line, may be employed within the bight portion which closes the half-lay and imparts flexibility and support at the bight. As completed, this modification will appear as in Figure 13.

In order to prevent the end of the cable, as shown in Figure 6, from splitting the whole-lay 10 by accidentally or otherwise being pulled down between the union of the legs of the bight, a different manner of associating the elements of the half-lays may be used, as is illustrated in Figure 10. It will be recognized that a cable disposed as in Figure 6 could effect the dissociation of the half-lays where they are arranged as in Figure 9 to form the whole-lay 10, especially if the two half-lays when intertwisted to form a whole-lay present wide gaps between any of the elements. However, if, instead of taking the strands of the half-lay in a contiguous group, as shown in Figure 9, they are so spaced that the elements which constitute the half-lay of the bight can be intertwisted alternately among the two legs, then a half-lay may be provided which is not subject to splitting as mentioned above. Thus, in Figure 10 two half-lay legs 5a and 5b have been depicted, it being assumed that each extends from its respective side of the bight portion similar to that shown in Figure 5 or Figure 8. As arranged in this figure, element 1a of the leg 5a would lie between the element 1 and the element 1b of the leg 5b, thus to occupy the vacant lay a. Similarly, element 1b of the leg 5b would occupy the vacant lay b in the leg 5a, which occurs between the elements 1a and 1c. Similarly, 1c of leg 5a would lie in the vacant lay c of leg 5b. Lay 1d of leg 5b would occupy lay d of leg 5a, and so on until each of the elements is accommodated and a whole-lay similar to any illustrated in these views and marked by the numeral 10 is provided. A cross section of this construction, as applied to a cable, appears in Figure 17.

In order to increase the holding power of the envelopes 10 when used as splices or dead-ends, a suitable grit or abrasive, such as aluminum oxide, carborundum, etc., usually in a suitable liquid vehicle, may be applied between the envelope and the underlying body. Another means for effecting this result is illustrated in Figure 11, where a dead-end has been shown. The envelope 10 is crimped, as at 11, to increase the modulus of friction upon the cable C. This may be done after installation by a suitable tool, in which case the cable, as well as the envelope, will be off-set, or it may be accomplished by preforming the off-set in the helices during manufacture or before installing them, so that when applied to the cable, the latter is made to conform, or to tend to conform, to the off-set portion. Considerable added resistance to axial displacement is thus realized.

Furthermore, the cross-sectional configuration of the elements is not essential, although it is less obvious that round sections will serve in the manner described, and since these are usually the most readily available and economic to produce, it is expected that they will have the widest application.

In Figure 12 there is shown a half-lay 5 formed into a bight portion B, from which legs 5a and 5b depend for mutually wrapping around a core or conductor C, which extends within the whole-lay thus formed for a distance C' short of the bight. The completed form of dead-end is shown in Figure 13, except that here the hollow half-lay of the bight portion B is filled with a filler F, as is shown in Figure 9. In either of these embodiments, the half-lays 5a and 5b substantially surround the conductor in balanced relation with respect to each other, and in their respective groups are in 180° relationship with respect to each other. Since an odd number of elements is shown to comprise the half-lay 5, only the central element 1m is projected around the bight to the opposite side of the core C in 180° relationship to itself, as is schematically depicted in the projection of Figure 18. In this latter figure, opposite elements 1m are shown, in which the longitudinal axis x thereof is shown projected through the bight portion B, outlined in dotted lines, returning to the 180° position on the other side of the core. These are the only two elements that will be in 180° relationship in this grouping. The remainder, however, will be mutually balancing.

In Figure 16 there is disclosed a completed dead-end made in accordance with the procedures previously referred to in conjunction with Figures 7 and 8. In this instance, the two legs 5a and 5b are intertwisted around a conductor C to be dead-ended, to constitute a whole-lay portion 10 around the latter, which extends therein for some distance C'', where it terminates within the bight portion B. Alternatively, as shown in Figure 20, the conductor C may terminate short of the bight at a point of termination C'.

Figure 17 illustrates a plurality of helically-preformed elements 1—1' grouped in balanced relation around a core member C after the manner of the legs 5a and 5b depicted in Figure 10. In this case the 180° relationship does not maintain either collectively in half-way groups or as to the individual elements, but these latter are nevertheless balanced in offsetting relation with respect to each other to preclude deflection of the core C throughout their coextensiveness.

With due consideration being given the degree of rigidity required which will vary among the several uses, the helically-preformed elements may be composed of any suitable material, whether metal, plastic, or otherwise, which best suits it to its intended use.

I claim:

1. A hollow body comprised of helically-preformed elements formed to a common pitch and internal diameter, said body being formed of a half-lay of said elements, said half-lay being bent back upon itself to define two half-lay legs, said half-lay legs being twisted together to form a whole lay.

2. A hollow body comprised of helically-preformed elements formed to a common pitch and internal diameter, said body being formed of a half-lay of said elements, said half-lay being bent back upon itself to define two half-lay legs and a bight, said half-lay legs being intertwisted to form a whole lay, and the elements of said bight being further twisted to define a closed lay from said half-lay portion.

3. A dead-end for cables and the like, comprising a plurality of helical elements preformed to an internal diameter approximately equal to the external diameter of the cable of application, a half-lay of said elements being applied around the cable tightly to grip the latter so that a portion of said half-lay engages the cable and another portion is free therefrom during application, said free portion being doubled back upon itself and upon said cable and being intertwisted with itself about said cable so as completely to enclose the latter while providing a bight portion thereon which defines a dead-end.

4. A cable dead-end or the like, which comprises a cable having an end portion curved back upon itself to define a bight, a half-lay of helical elements, preformed to an internal diameter and pitch of a size tightly to grip the cable when applied thereto without exceeding their elastic limit, wrapped around said cable in coaxial relation thereto, and extending around the bight portion thereof back to the cable, and being intertwisted with itself completely to enclose said cable from said bight for a distance along the length of said cable.

5. As a new article of manufacture, a tubular body comprised of a half-lay of helically-preformed elements doubled back upon itself, and intertwisted to form a whole lay terminating in a bight portion.

6. The method of forming an elongated body having a bight integrally fashioned thereon, which comprises forming a half-lay of helically-preformed elements, bending the half-lay back upon itself to define a bight and two half-lay legs, and intertwisting said legs to provide a whole-lay body upon said bight.

7. A method of dead-ending cables, which comprises embracing such a cable with a half-lay of tightly-gripping helically-preformed elements so that part of the half-lay engages the cable, and part extends free therefrom, bending the free part to form a bight, and then intertwisting the free part with the engaged part to enclose the cable.

8. A dead-end comprising an elongated body to be dead-ended, a helically-preformed element of constant open pitch throughout its length and of an internal helical diameter less than the outside diameter of said body, said element being bent adjacent its middle to define a bight having legs projecting therefrom, said legs each being wrapped around said body so that the helical axis of each is coincident with the longitudinal axis of said body and so that the helix of one leg is in substantially 180° phase relationship with the helix of the other with respect to said body throughout their coextensiveness along the latter.

9. The invention of claim 8, in which another preformed helix of essentially identical helical characteristics as said element is disposed coaxially therewith around said body between the legs of said element.

10. The invention of claim 9, further characterized by a plurality of helices between said legs in symmetrical, mutually balanced relationship.

11. The invention of claim 8, said dead-end being composed of a plurality of said elements of identical helical characteristics in mutually conforming, coaxial relation around said body, and mutually balanced with respect thereto.

12. A structure comprising two elongated portions whose length greatly exceeds their respective major transverse dimension, said portions each being preformed into helices of identical pitch angle and hand of lay, said helices having a pitch length several times greater than their internal helical diameter, said portions being connected together in spaced relation and held relative to each other so that when they are intertwisted to dispose their helices in coaxial relation, the pitches thereof are in 180° phase with respect to each other, said portions being intertwisted together in this manner.

13. A gripping device for a linear body, consisting of more than two preformed helical elements formed to a constant open pitch and to an internal helical diameter less than the outside diameter of such body for application to the body from its side in gripping relation therewith, said elements being in balanced peripheral distribution around the body and projecting from an end thereof, and means for holding a plurality of the projected ends of said elements together, said projected ends and said means cooperating to define a bearing eye portion for attachment to an external object to be engaged.

14. A gripping device comprising a plurality of helices mutually conforming as to hand of lay, internal helical diameter, and pitch length, the latter two dimensions being such as to admit of wrapping the helices around a linear body from a side of the body into tightly gripping, encircling relation therewith, said helices being inter twisted into association coaxially with each other, and, as associated, defining a relatively straight linear body gripping portion and a curved bight portion at one end of said gripping portion.

15. The method of forming a gripping device which includes grouping a plurality of helically-preformed, mutually-conforming elements having an internal helical diameter of a size tightly to grip a core element when wrapped around the latter in encircling engagement, bending said elements adjacent their middle to form a bight portion having helical legs depending therefrom, and wrapping said legs around the core in gripping relation therewith.

16. The invention of claim 14, in which said helices are arranged in two half-lays, said half-lays being partially overlapped and intertwisted into a first coaxial association throughout their overlapped extent to constitute a whole lay in said curved bight portion, said bight portion having two half-lay portions extending therefrom, said half-lay portions being intertwisted to form a second coaxial association of said helices in the constitution of said relatively straight linear body gripping portion.

17. The invention of claim 14, in which said helices are arranged in two half-lays, one half-lay being shorter in extent than the other, said half-lays being intertwisted into a first coaxial association in which the shorter half-lay is incorporated intermediate the ends of the longer half-lay to constitute a whole lay in said curved bight portion having two half-lay portions extending therefrom, said half-lay portions being intertwisted to form a second coaxial association of said helices in the constitution of said relatively straight linear body gripping portion.

18. The invention of claim 14, in combination with a cable, in which said helices are arranged in two half-lays, one of said half-lays being disposed about the cable adjacent its end, the other of said half-lays being partially intertwisted with said first half-lay in coaxial relation about the cable to constitute a whole-lay in said curved bight portion with the remaining part of said second half-lay extended into contiguity with said first half-lay upon the cable, said half-lays being intertwisted about the cable to form a coaxial whole-lay in the constitution of said relatively straight linear body gripping portion.

19. The invention of claim 14, in which said helices are arranged in a half-lay bent adjacent its middle, to define said curved bight portion having half-lay legs extending therefrom, said half-lay legs being intertwisted to define said relatively straight linear body gripping portion, in combination, a cable disposed within said linear body gripping portion, and a short length of a filler body disposed within said half-lay at said curved bight portion at least partially to support and fill said half-lay therein.

20. The method of claim 15, in which the grouping of said elements includes first arranging them into two half-lays, intertwisting said half-lays for a portion of their extends at said bight portion before bending of the latter, finally bending said half-lays to define said bight portion and said dependent helical legs, and then intertwisting said legs while simultaneously wrapping them around said core.

References Cited in the file of this patent

UNITED STATES PATENTS

| | | |
|---|---|---|
| 337,513 | Moxham | Mar. 9, 1886 |
| 2,275,019 | Peterson | Mar. 3, 1942 |